United States Patent
Takahashi et al.

(10) Patent No.: US 10,432,054 B2
(45) Date of Patent: Oct. 1, 2019

(54) VEHICLE BRUSHLESS AC GENERATOR

(71) Applicant: Mitsubishi Electric Corporation, Chiyoda-ku, Tokyo (JP)

(72) Inventors: Tomoki Takahashi, Chiyoda-ku (JP); Hideyuki Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 896 days.

(21) Appl. No.: 14/283,387

(22) Filed: May 21, 2014

(65) Prior Publication Data

US 2015/0171688 A1 Jun. 18, 2015

(30) Foreign Application Priority Data

Dec. 18, 2013 (JP) ................. 2013-260762

(51) Int. Cl.
*H02K 3/46* (2006.01)
*H02K 3/34* (2006.01)
*H02K 1/24* (2006.01)

(52) U.S. Cl.
CPC ............... *H02K 3/46* (2013.01); *H02K 1/243* (2013.01); *H02K 3/34* (2013.01)

(58) Field of Classification Search
CPC ........ H02K 5/22; H02K 1/145; H02K 21/145; H02K 21/044; H02K 1/243; H02K 3/04; H02K 19/22; H02K 3/34; H02K 3/50; H02K 19/24; H02K 3/28; H02K 5/225; H02K 3/52; H02K 3/525; H02K 3/527; H02K 3/528; H02K 3/46

USPC ........... 310/156.66, 156.67, 156.68, 156.69, 310/156.71, 156.72, 156.73, 257, 263, 310/68 R, 71, 95
See application file for complete search history.

(56) References Cited

U.S. PATENT DOCUMENTS

| | | | | |
|---|---|---|---|---|
| 3,694,661 A | * | 9/1972 | Minowa | H02K 7/1815 290/1 R |
| 4,087,713 A | * | 5/1978 | Binder | H02K 3/46 310/263 |
| 4,340,829 A | * | 7/1982 | McCoy | H02K 3/522 310/194 |

(Continued)

FOREIGN PATENT DOCUMENTS

| | | | | |
|---|---|---|---|---|
| GB | 860687 A | * | 2/1961 | ........... H02K 19/24 |
| GB | 2025708 A | * | 1/1980 | ........... H02K 21/044 |

(Continued)

OTHER PUBLICATIONS

Murata (JP 2002136016 A) English Translation.*
Communication dated Nov. 4, 2014 from the Japanese Patent Office in counterpart application No. 2013-260762.

*Primary Examiner* — Quyen P Leung
*Assistant Examiner* — Robert E Mates
(74) *Attorney, Agent, or Firm* — Sughrue Mion, PLLC; Richard C. Turner

(57) ABSTRACT

Provided is a vehicle brushless AC generator capable of improving workability and improving insulation property to enhance reliability while preventing a decrease in slot space factor of a stator coil. In the vehicle brushless AC generator, grooves (20a, 20b) are formed in an inner wall of a front bracket (20), and a mold body (26) for insulating and protecting a lead wire (25) is mounted into the grooves (20a, 20b).

15 Claims, 7 Drawing Sheets

(56) References Cited

U.S. PATENT DOCUMENTS

| | | | | |
|---|---|---|---|---|
| 4,636,673 | A | * | 1/1987 | McDonald ............... H02K 5/00 310/91 |
| 6,293,705 | B1 | * | 9/2001 | Elsing .................. F16C 35/077 384/605 |
| 7,575,485 | B2 | * | 8/2009 | Waltz ....................... H01R 4/20 174/74 R |
| 2002/0121019 | A1 | * | 9/2002 | Hasegawa .............. H02K 5/225 29/857 |
| 2011/0148232 | A1 | * | 6/2011 | Mori ..................... H02K 3/528 310/71 |

FOREIGN PATENT DOCUMENTS

| | | | |
|---|---|---|---|
| JP | 03-195348 | A | 8/1991 |
| JP | 7-336974 | A | 12/1995 |
| JP | 9-215110 | A | 8/1997 |
| JP | 2002136016 | A * | 5/2002 |
| JP | 4450134 | B2 | 4/2010 |

\* cited by examiner

VEHICLE BRUSHLESS AC GENERATOR

BACKGROUND OF THE INVENTION

1. Field of the Invention

The present invention relates to a vehicle brushless AC generator to be mounted on a vehicle, such as an automobile, a bus, and a truck.

2. Description of the Related Art

In a related-art vehicle brushless AC generator, there is known a structure in which a field coil is mounted in a front bracket and a control circuit unit including a voltage regulator and a rectifier is mounted in a rear bracket so that the control circuit unit may be avoided from being thermally affected by a front-side bearing that generates a large amount of heat (see, for example, Japanese Patent Application Laid-open No. Hei 03-195348).

As another related art, a lead wire as a lead-out portion of the field coil is connected to the voltage regulator from a conductive wire path formed in a stationary yoke section through a first notch groove formed in an outer peripheral-side inner wall surface of a front frame, a through bolt-use notch groove formed in an outer peripheral surface of a stator core, and a second notch groove formed in an outer peripheral-side inner wall surface of a rear frame (see, for example, Japanese Patent No. 4450134).

In the related-art vehicle brushless AC generator as disclosed in Japanese Patent Application Laid-open No. Hei 03-195348, a connection bracket for connecting the field coil and the voltage regulator together is mounted while passing through a slot of the stator core, and hence a slot space factor of a stator coil in the stator core may decrease to reduce an output. There is also another problem in that the work of mounting the connection bracket into the narrow slot becomes cumbersome.

In the related-art vehicle brushless AC generator as disclosed in Japanese Patent No. 4450134, the lead wire of the field coil is provided directly on the notch grooves formed in the respective frames and the stator core, and hence there is a problem in that the lead wire is susceptible to vibration, water, or dust and the coating of the lead wire may be damaged to reduce reliability due to insufficient insulation property.

SUMMARY OF THE INVENTION

The present invention has been made to solve the above-mentioned problems, and it is an object thereof to provide a vehicle brushless AC generator capable of improving workability and improving insulation property to enhance reliability while preventing a decrease in slot space factor of a stator coil.

According to one embodiment of the present invention, there is provided a vehicle brushless AC generator, including: a rotary shaft; a magnetic pole core firmly fixed to the rotary shaft, the magnetic pole core having a magnetic pole; a field coil fixedly mounted on an inner peripheral portion of the magnetic pole core; a yoke section that firmly fixes the field coil to form a magnetic circuit with a bias of the field coil; a bowl-shaped front bracket that firmly fixes the yoke section and is supported by the rotary shaft through intermediation of a front bearing; a stator core arranged to be opposed to the magnetic pole core through intermediation of a minute air gap; a stator coil wound around the stator core; a bowl-shaped rear bracket that firmly fixes the stator core together with the bowl-shaped front bracket and is supported by the rotary shaft through intermediation of a rear bearing; a voltage regulator mounted to the bowl-shaped rear bracket, for controlling an energization current of the field coil; a lead wire having one end connected to the field coil and another end connected to the voltage regulator, the lead wire being arranged at an inner peripheral portion of each of the bowl-shaped front bracket and the bowl-shaped rear bracket; a groove formed in an inner wall of the bowl-shaped front bracket; and a mold body mounted in the groove, for insulating and protecting the lead wire.

According to one embodiment of the present invention, the lead wire is arranged at the inner peripheral portions of the brackets, and hence the coil space factor in the slot is not decreased unlike the related art, thus improving the output. Further, the lead wire can be mounted in the mold body provided in the groove of the inner wall of the front bracket, and hence the mounting workability is improved. Further, the lead wire is mounted in the groove through intermediation of the mold body, and hence the environment resistance to vibration, water, dust, or the like is improved to obtain sufficient insulation property, thus enhancing the reliability.

DETAILED DESCRIPTION OF THE PREFERRED EMBODIMENT

First Embodiment

Figure 1:
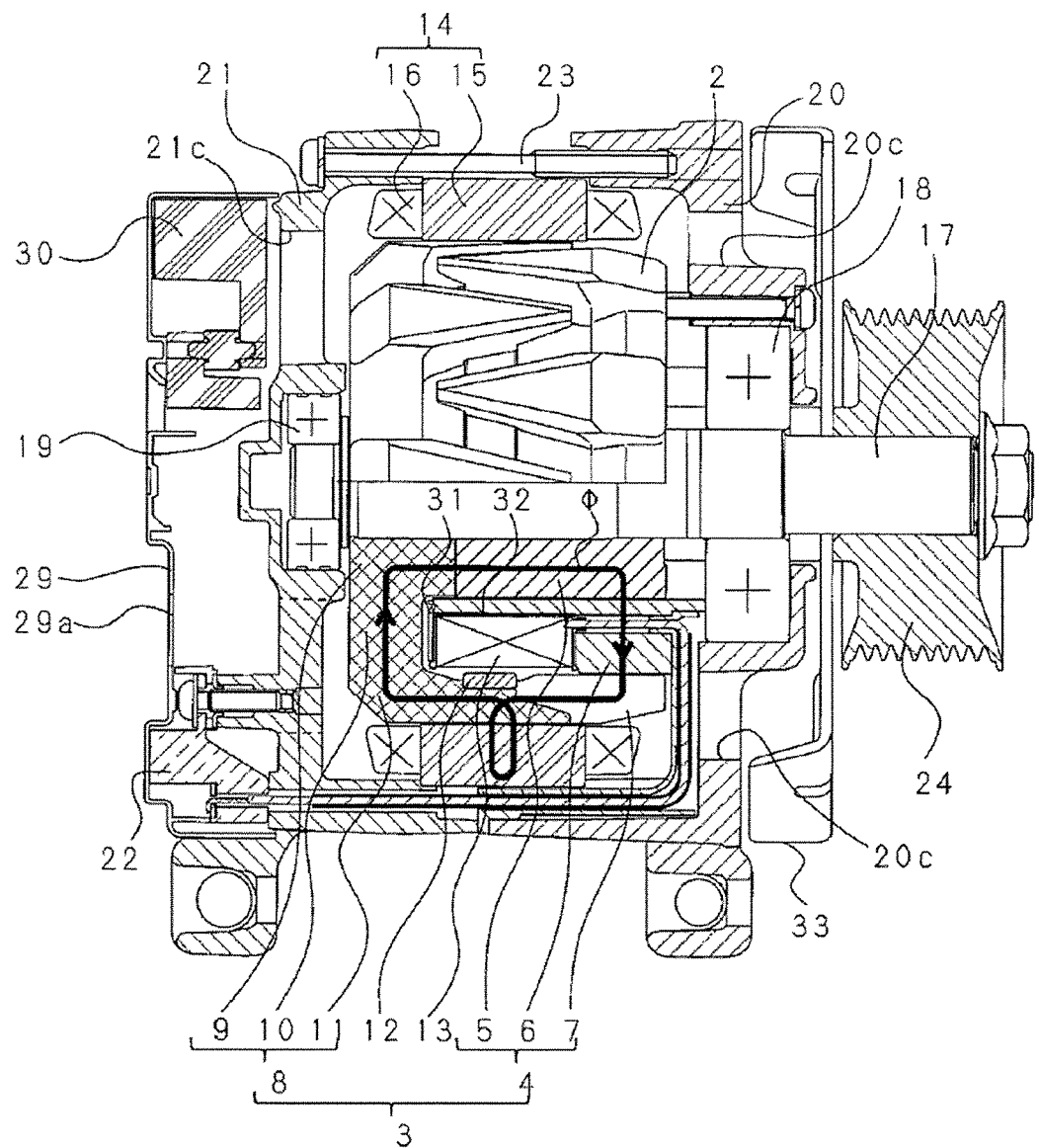
FIG. 1 is a vertical cross-sectional view illustrating a vehicle brushless AC generator according to a first embodiment of the present invention.
Figure 2:
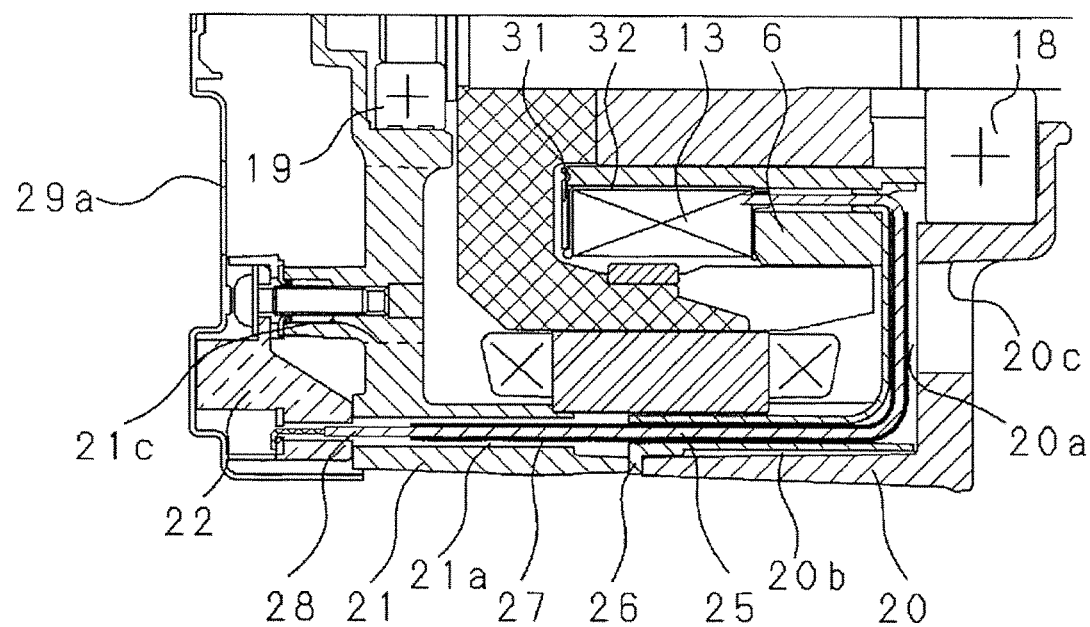
FIG. 2 is an enlarged cross-sectional view illustrating a main portion of FIG. 1.
Figure 3:
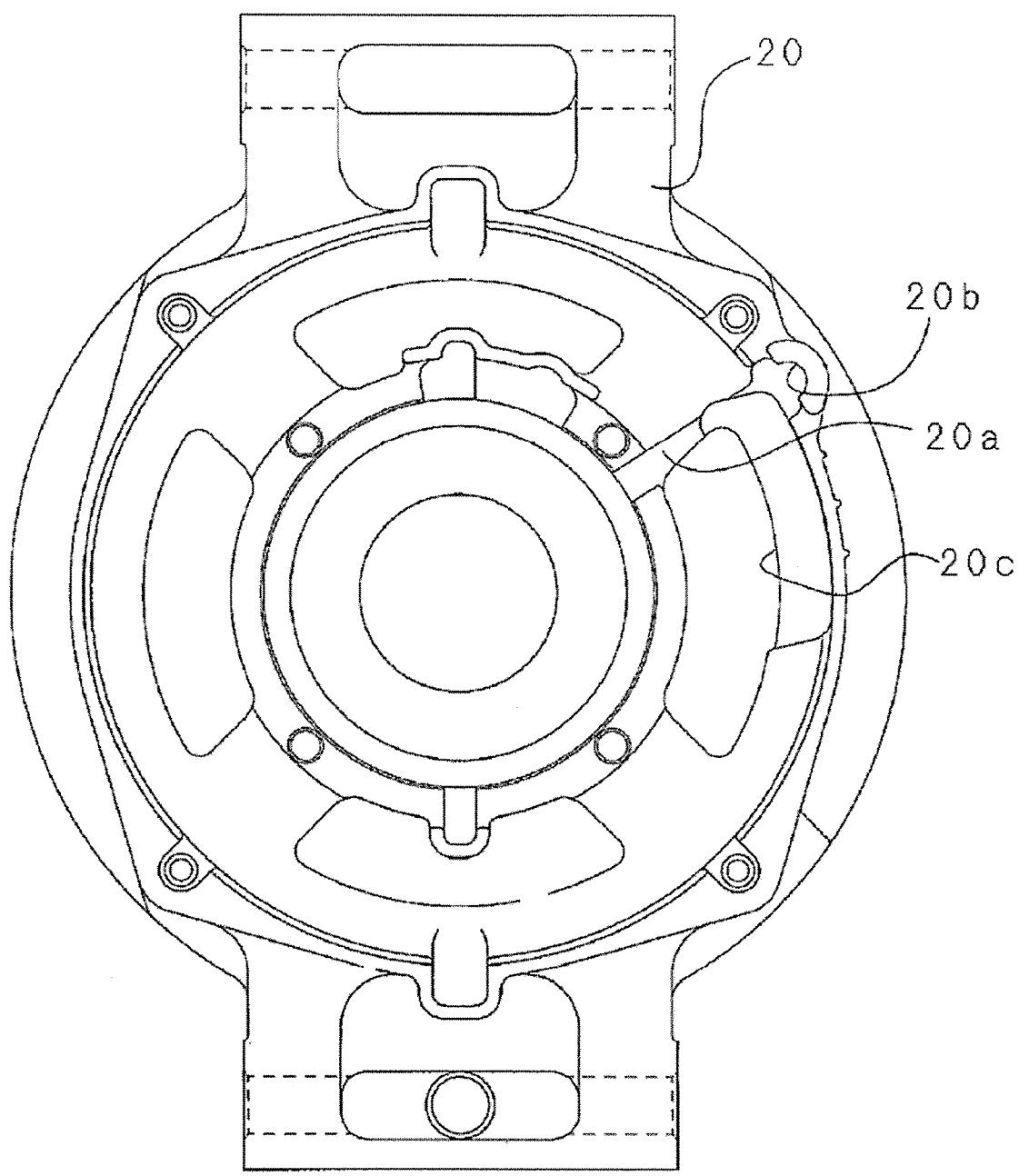
FIG. 3 is a front view illustrating a front bracket of the vehicle brushless AC generator illustrated in FIG. 1.
Figure 4:
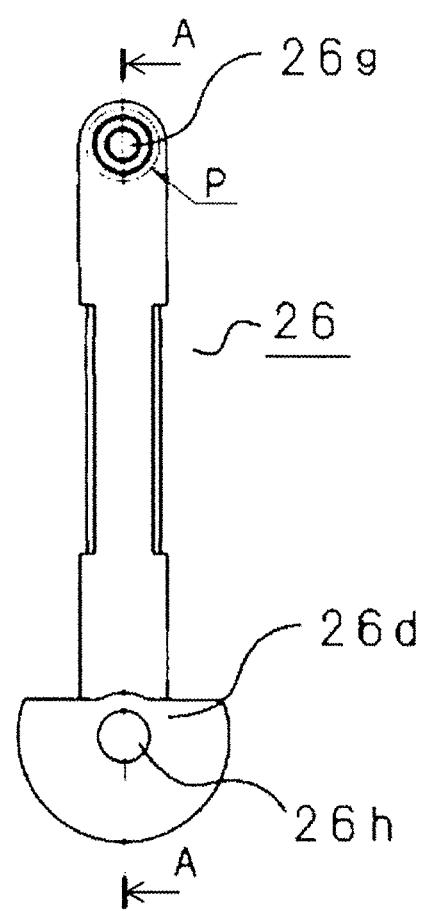
FIG. 4 is a front view illustrating a mold body as a main portion of the vehicle brushless AC generator illustrated in FIG. 1.
Figure 5:
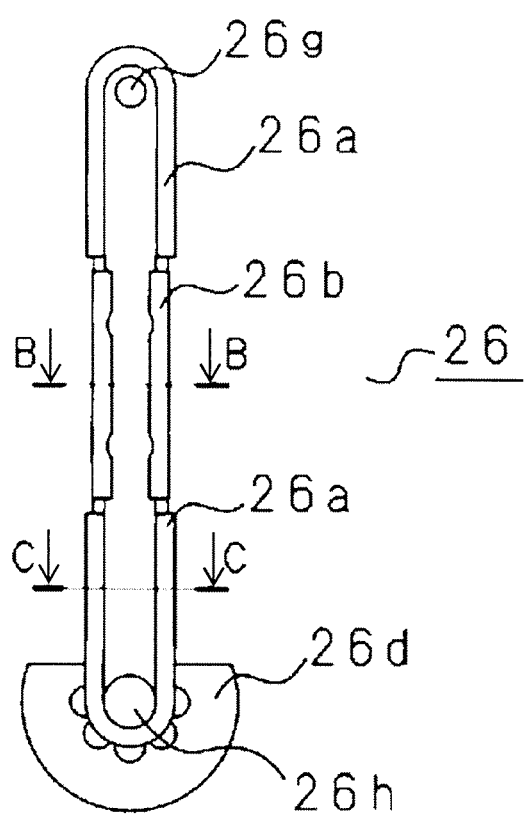
FIG. 5 is a rear view illustrating the mold body as the main portion of the vehicle brushless AC generator illustrated in FIG. 1.
Figure 6:
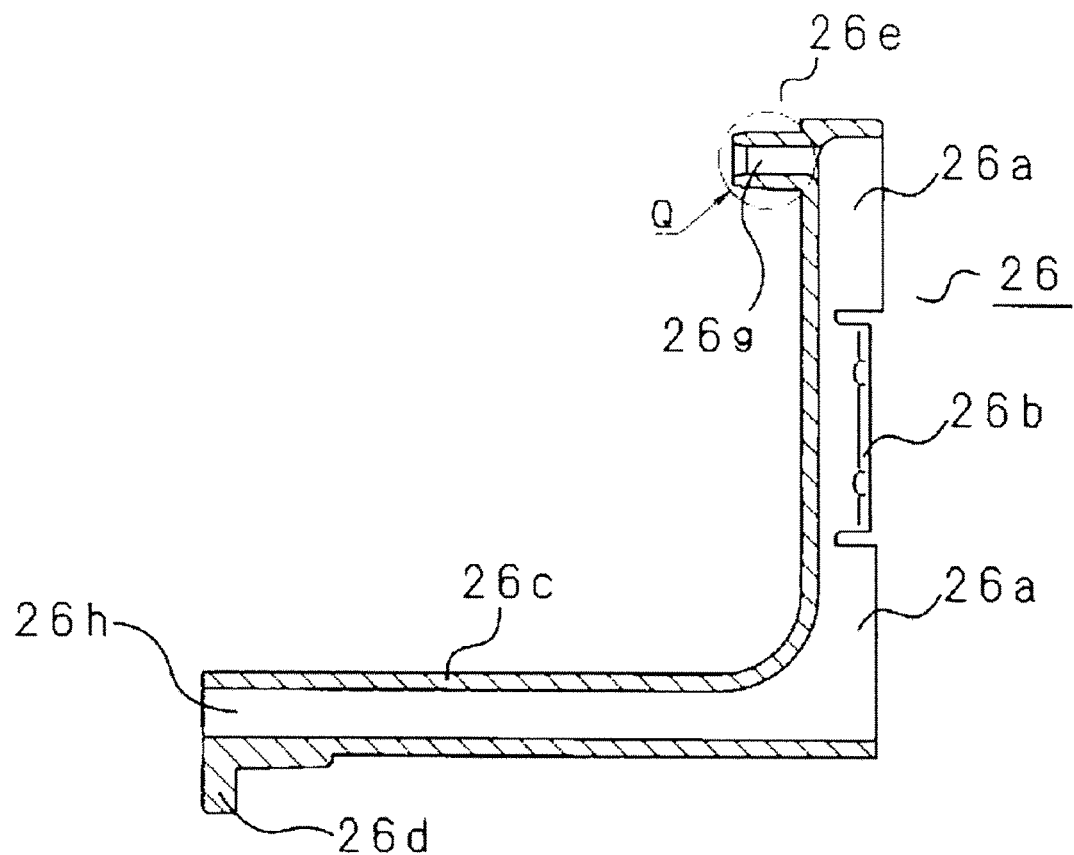
FIG. 6 is a cross-sectional view taken along the line A-A of FIG. 4.
Figure 7:
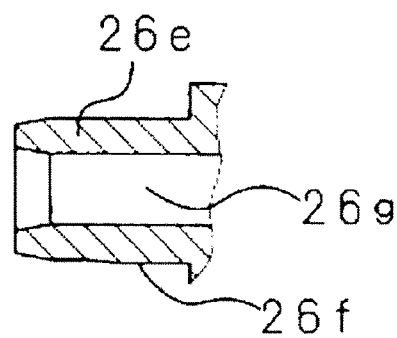
FIG. 7 is an enlarged view of the portion Q illustrated in FIG. 6.
Figure 8:
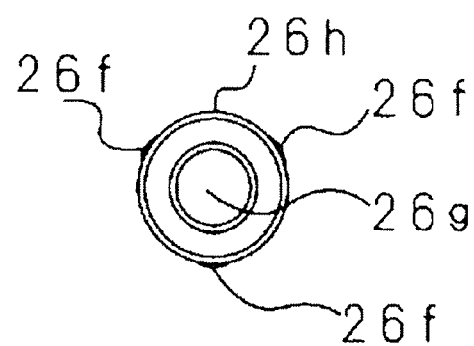
FIG. 8 is an enlarged view of the portion P illustrated in FIG. 4.
Figure 9:
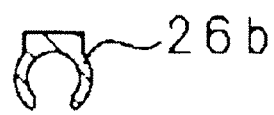
FIG. 9 is a cross-sectional view taken along the line B-B of FIG. 5.
Figure 10:
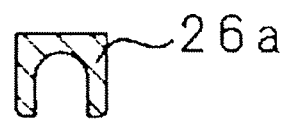
FIG. 10 is a cross-sectional view taken along the line C-C of FIG. 5.

FIG. 1 is a vertical cross-sectional view illustrating a vehicle brushless AC generator according to a first embodiment of the present invention. FIG. 2 is an enlarged cross-sectional view illustrating a main portion of FIG. 1. FIG. 3 is a front view illustrating a front bracket of FIG. 1. FIG. 4 is a front view illustrating a mold body as a main portion of the vehicle brushless AC generator illustrated in FIG. 1. FIG. 5 is a rear view illustrating the mold body as the main portion of the vehicle brushless AC generator illustrated in FIG. 1. FIG. 6 is a cross-sectional view taken along the line A-A of FIG. 4. FIG. 7 is an enlarged view of the portion Q illustrated in FIG. 6. FIG. 8 is an enlarged view of the portion P illustrated in FIG. 4. FIG. 9 is a cross-sectional view taken along the line B-B of FIG. 5. FIG. 10 is a cross-sectional view taken along the line C-C of FIG. 5.

Referring to FIGS. 1 to 3, a rotor 2 is provided to a rotary shaft 17, and further, the rotor 2 has a magnetic pole core 3 for transferring a magnetic flux. The magnetic pole core 3 includes a first magnetic pole core 4 and a second magnetic pole core 8. In a first boss section 5 of a rotary member of the first magnetic pole core 4, a through hole for inserting the rotary shaft 17 therethrough is formed at an axial center position. A ring-shaped fixed yoke section 6 firmly fixed to a bowl-shaped front bracket 20 is arranged on a radially outer side of the first boss section 5 through intermediation of a minute air gap. A field coil 13 is fixed at an axial end portion of the yoke section 6 through intermediation of a plate 31 and a bobbin 32. Further, a first claw-shaped magnetic pole section 7 is arranged on a radially outer side of the yoke section 6 through intermediation of a minute air gap. The first claw-shaped magnetic pole section 7 is firmly fixed to a second claw-shaped magnetic pole section 11 through intermediation of a ring 12 as a non-magnetic member, and is arranged so as to be engaged with the second claw-shaped magnetic pole section 11. Note that, the rotary shaft 17 is press-fitted into a through hole formed at an axial center of the first magnetic pole core 4, and is mounted thereto in a relatively unrotatable manner. In a second boss section 9 of the second magnetic pole core 8, on the other hand, an insertion hole for inserting the rotary shaft 17 therethrough is formed at an axial center position similarly to the first magnetic pole core 4. A yoke section 10, which is a ring-shaped rotary member, extends from one end of the second boss section 9 to the radially outer side, and further, the second claw-shaped magnetic pole section 11 extends from an outer periphery of the yoke section 10 toward the other axial end.

Note that, the rotary shaft 17 is press-fitted into an insertion hole formed at an axial center of the second magnetic pole core 8, and is mounted thereto in a relatively unrotatable manner under a state in which an axial end surface of the second boss section 9 abuts on the other axial end surface of the first boss section 5.

In addition, a stator 14 includes a stator core 15 having a stator coil 16 wound therearound, and is arranged so as to surround an outer periphery of the rotor 2. The front bracket 20 sandwiches the stator core 15 together with a rear bracket 21 with through bolts 23 across shoulder portions of both axial ends of the stator core 15. Then, the front bracket 20 rotatably supports one end side of the rotary shaft 17 through intermediation of a front bearing 18, and the rear bracket 21 rotatably supports the other end side of the rotary shaft 17 through intermediation of a rear bearing 19. In this manner, the rotor 2 is rotatably arranged in the front bracket 20 and the rear bracket 21. A cooling fan 33 is firmly fixed to the rotary shaft 17 on the outer side of the front bracket 20. Further, a pulley 24 is firmly fixed at one end of the rotary shaft 17 extending from the front bracket 20 to the outside, and is driven by an engine (not shown).

A voltage regulator 22 for controlling an energization current of the field coil 13 is mounted outside the rear bracket 21. A resin cover 29 is firmly fixed to the rear bracket 21 so as to surround the voltage regulator 22 and a rectifier 30. A plurality of intake holes 29a for introducing a cooling air are formed in the resin cover 29. A lead wire 25 for connecting the voltage regulator 22 and the field coil 13 together is arranged at inner peripheral portions of both the brackets 20 and 21. One end of the lead wire 25 is connected to the field coil 13, and the other end thereof is connected to the voltage regulator 22. A first insulating tube 28, which is formed of an impregnated resin substantially over its overall length, is mounted around an outer periphery of the lead wire 25. A receiving groove 20a, which is a square recess portion, is formed in aside inner wall of the front bracket 20. Further, a receiving groove 20b, which is a recess having an arc-shaped cross section, is formed in an inner wall of the front bracket 20 on the side on which the stator core 15 is mounted. Then, a mold body 26 for insulating and protecting the lead wire 25 is fitted into the receiving grooves 20a and 20b. A part of the mold body 26 to be fitted into the receiving groove 20a is formed into a square shape, and a part of the mold body 26 to be fitted into the receiving groove 20b is formed into a cylindrical shape. Those parts are positioned and received in the respective grooves 20a and 20b.

The cooling fan 33, which is an external centrifugal fan and firmly fixed to the rotary shaft 17, is provided between the outer side of the front bracket 20 and the pulley 24. A plurality of ventilation holes 20c and 21c are formed in the front bracket 20 and the rear bracket 21, respectively. When the cooling fan 33 is rotated, a cooling air is circulated from the intake air 29a of the cover 29 to the radially outer side while passing through the ventilation holes 21c of the rear bracket 21, the space between the claw-shaped magnetic pole sections 7 and 11, an inner peripheral surface of the stator coil 16, and the ventilation holes 20c of the front bracket 20.

Next, the mold body 26 is described in more detail with reference to FIGS. 4 to 10.

As illustrated in FIG. 6, the mold body 26 is formed into a substantially inverted L-shape in cross section, and is integrally molded with a resin so that the lead wire 25 may be mounted therein.

At one end portion of the mold body 26 to be fixed to the yoke section 6, a protrusion portion 26e to be fitted into the through hole of the yoke section 6 is provided. A through hole 26g for inserting the lead wire 25 therethrough is formed in the protrusion portion 26e.

At an outer peripheral portion of the protrusion portion 26e, projections 26f are equiangularly formed at three positions. With the projections 26f, the mold body 26 can be fixedly positioned at the yoke section 6 reliably.

The mold body 26 further includes a mounting portion 26a that has a square cross section and opens on one side so as to be fitted into the groove 20a of the front bracket 20, and sandwiching portions 26b for sandwiching the lead wire 25 to prevent the lead wire 25 from protruding out of the mold body 26.

A cylindrical portion 26c to be fitted into the groove 20b, which is formed in the front bracket 20 on the side on which the stator core is mounted, extends in the axial direction, and a flange portion 26d is provided at an end portion of the cylindrical portion 26c.

A through hole 26h for inserting the lead wire 25 therethrough is formed in the cylindrical portion 26c.

The flange portion 26d is fitted between both the brackets 20 and 21 and fixed reliably.

A through hole 21a for inserting and holding the lead wire 25 therethrough is formed in the inner peripheral portion of the rear bracket 21. The through hole 21a is circular in cross section, and the inner diameter thereof is set to be larger than a lead wire diameter so that the lead wire 25 may be inserted therethrough. On most part of the lead wire 25 to be mounted in the receiving grooves 20a and 20b and the through hole 21a, a second tube 27 made of a silicon tube is mounted around an outer periphery of the first tube 28. In addition, the end of the lead wire 25 on the field coil 13 side is connected to the field coil 13 through a through hole formed in an inner peripheral portion of the yoke section 6.

In the vehicle brushless AC generator configured in this way, when a current is supplied to the field coil 13 from a battery (not shown), a magnetic flux φ is generated around the field coil 13. The magnetic flux φ flows in the following path. The magnetic flux φ is transferred from the yoke section 6 to the first boss section 5 through the minute air gap formed on the radially inner side, and is then transferred from the second boss section 9 whose end surface abuts on the first boss section 5 to pass through the yoke section 10 and the second claw-shaped magnetic pole section 11, and to cross the stator 14 arranged on the radially outer side of the rotor 2. The magnetic flux φ subsequently passes through the first claw-shaped magnetic pole section 7 and the minute air gap formed on the radially inner side thereof, and finally returns to the yoke section 6. Thus, the second claw-shaped magnetic pole section 11 is magnetized to the N pole, and the first claw-shaped magnetic pole section 7 is magnetized to the S pole.

On the other hand, when the pulley 24 is driven by the engine, the rotary shaft 17 coupled directly to the pulley 24 is rotated to rotate the rotor 2. Through the rotation of the rotor 2, a magnetic field generated by the field coil 13 is also rotated. The magnetic flux φ forming the rotating magnetic field flows in the above-mentioned path to be applied to the stator core 15, to thereby generate an AC electromotive force in the stator coil 16. With the AC electromotive force, an AC current generated in the stator coil 16 is rectified into a DC current by the rectifier 30, and the battery (not shown) is charged. In this case, the field coil 13 is not rotated because the field coil 13 is mounted on the yoke section 6 firmly fixed to the front bracket 20, but the first boss section 5 and the first claw-shaped magnetic pole section 7 of the first magnetic pole core 4 and the second magnetic pole core 8 integrally including the second boss section 9, the yoke section 10, and the second claw-shaped magnetic pole section 11 are rotated.

According to the first embodiment, the lead wire 25 is inserted through the mold body 26, and hence the lead wire 25 can be fixedly held and can be protected from the rotor 2 electrically and mechanically. The mold body 26 can be mounted on each of the brackets 20 and 21 through the receiving grooves 20a and 20b formed in the front bracket 20 and the through hole 21a formed in the rear bracket 21. Consequently, the mold body 26 can be prevented from falling off even when vibrated, and can be sufficiently protected from water and dust. Besides, the positioning of the mold body 26 is facilitated, and hence the lead wire 25 can be fixed to each of the brackets 20 and 21 reliably and easily.

The flange portion 26d of the mold body 26 is fixedly sandwiched between both the brackets 20 and 21. Consequently, the mold body 26 can be fixedly held reliably. Besides, the work of fixing the lead wire 25 with an adhesive or the like is eliminated, and hence the workability is improved.

A fixing method using an adhesive or the like has a problem in that the adhesive may peel off in actual use and the rotor 2 and the lead wire 25 may be brought into contact with each other. However, the fixing means according to the present invention can solve this problem.

In addition, the lead wire 25 is inserted through the mold body 26 and the double tubes 27 and 28, and hence the exposed area of the lead wire 25 can be reduced to further reduce the influence of water, dust, and the like.

Besides, the lead wire 25 is inserted through the through hole 21a of the rear bracket 21 in order to be connected to the voltage regulator 22 mounted outside the rear bracket 21, and hence the lead wire 25 can be connected to the voltage regulator 22 with very small dimensions, and further, can be protected and led out reliably.

Note that, the structure in which the double tubes 27 and 28 are mounted around the lead wire 25 has been exemplified in the above-mentioned embodiment, but only one tube 28 may be mounted.

Further, the structure in which the part of the lead wire 25 on the field coil 13 side is led out from the inner peripheral portion of the yoke section 6 has been exemplified, but the part of the lead wire 25 on the field coil 13 side may be led out from an outer peripheral portion of the yoke section 6.

Note that, the structure in which the voltage regulator 22 is mounted outside the rear bracket 21 has been exemplified in the above-mentioned embodiment, but the present invention is not limited thereto. The voltage regulator 22 may be mounted inside the rear bracket 21. In this case, instead of forming the through hole 21a, a receiving groove may be formed in an inner wall of the rear bracket 21, and the lead wire 25 may be received directly in the groove. Further, when the lead wire 25 is received in the groove through the intermediation of the mold body similarly to the mold body 26, the lead wire 25 can be protected more reliably.

Further, the claw-shaped magnetic pole has been exemplified above as a rotating magnetic pole, but the present invention is not limited thereto.

What is claimed is:

1. A vehicle brushless AC generator, comprising:
    a rotary shaft;
    a magnetic pole core firmly fixed to the rotary shaft, the magnetic pole core having a magnetic pole;
    a field coil fixedly mounted on an inner peripheral portion of the magnetic pole core;
    a yoke section that firmly fixes the field coil to form a magnetic circuit with a bias of the field coil;
    a bowl-shaped front bracket that firmly fixes the yoke section and is supported by the rotary shaft through intermediation of a front bearing;
    a stator core arranged to be opposed to the magnetic pole core through intermediation of a minute air gap;
    a stator coil wound around the stator core;
    a bowl-shaped rear bracket that firmly fixes the stator core together with the bowl-shaped front bracket and is supported by the rotary shaft through intermediation of a rear bearing;
    a voltage regulator mounted to the bowl-shaped rear bracket, for controlling an energization current of the field coil;
    a lead wire having one end connected to the field coil and another end connected to the voltage regulator, the lead wire being arranged at an inner peripheral portion of each of the bowl-shaped front bracket and the bowl-shaped rear bracket;
    a groove formed in an inner wall of the bowl-shaped front bracket; and
    a mold body mounted in the groove, the mold body comprising a body formed separately from the lead wire and into which the lead wire is insertable, so as to be disposed about an outermost layer of the lead wire for insulating and protecting the lead wire.

2. A vehicle brushless AC generator according to claim 1, wherein a part of the mold body on an opposite side of the field coil is sandwiched between the bowl-shaped front bracket and the bowl-shaped rear bracket.

3. A vehicle brushless AC generator according to claim 1, wherein the mold body has one end fitted into an inner peripheral portion of the yoke section and another end sandwiched between the bowl-shaped front bracket and the bowl-shaped rear bracket, and wherein the mold body comprises a connection portion that connects the one end and the another end together, the connection portion being fitted into the groove formed in the inner wall of the bowl-shaped front bracket.

4. A vehicle brushless AC generator according to claim 1, wherein the inner peripheral portion of the bowl-shaped rear bracket has a through hole formed therein for inserting and holding the lead wire therethrough.

5. A vehicle brushless AC generator according to claim 1, further comprising an insulating tube mounted around the lead wire.

6. A vehicle brushless AC generator according to claim 1, wherein a part of the lead wire on the field coil side is led out to the mold body from an inner peripheral portion of the yoke section to enter said mold body at a location within said inner peripheral portion of said yoke section.

7. A vehicle brushless AC generator according to claim 1, further comprising a cooling fan provided outside the bowl-shaped front bracket and firmly fixed to the rotary shaft, the cooling fan being configured to circulate a cooling air from a ventilation hole of the bowl-shaped rear bracket to a ventilation hole of the bowl-shaped front bracket.

8. A vehicle brushless AC generator according to claim 7, further comprising a cover provided on the bowl-shaped rear bracket to surround the voltage regulator, wherein the cover has an intake hole formed therein through which the cooling air is taken by rotation of the cooling fan.

9. A vehicle brushless AC generator according to claim 1, wherein the mold body is provided substantially in an L-shape in cross-section having a first portion extending in an axial direction of the vehicle brushless AC generator and a second portion extending substantially perpendicularly therefrom.

10. A vehicle brushless AC generator according to claim 9, wherein the first portion of the mold body has a first cross-sectional shape and the second portion of the mold body has a second cross-sectional shape different from the first cross-sectional shape.

11. A vehicle brushless AC generator, comprising:
a rotary shaft;
a magnetic pole core firmly fixed to the rotary shaft, the magnetic pole core having a magnetic pole;
a field coil fixedly mounted on an inner peripheral portion of the magnetic pole core;
a yoke section that firmly fixes the field coil to form a magnetic circuit with a bias of the field coil;
a bowl-shaped front bracket that firmly fixes the yoke section and is supported by the rotary shaft through intermediation of a front bearing;
a stator core arranged to be opposed to the magnetic pole core through intermediation of a minute air gap;
a stator coil wound around the stator core;
a bowl-shaped rear bracket that firmly fixes the stator core together with the bowl-shaped front bracket and is supported by the rotary shaft through intermediation of a rear bearing;
a voltage regulator mounted to the bowl-shaped rear bracket, for controlling an energization current of the field coil;
a lead wire having one end connected to the field coil and another end connected to the voltage regulator, the lead wire being arranged at an inner peripheral portion of each of the bowl-shaped front bracket and the bowl-shaped rear bracket;
a groove formed in an inner wall of the bowl-shaped front bracket; and
a mold body mounted in the groove, the mold body comprising a body formed separately from the lead wire and into which the lead wire is insertable, so as to be disposed about an outermost layer of the lead wire for insulating and protecting the lead wire;
wherein the mold body is provided substantially in an L-shape in cross-section having a first portion extending in an axial direction of the vehicle brushless AC generator and a second portion extending substantially perpendicularly therefrom; and
wherein the second portion of the mold body has an opening which opens toward a ventilation hole of the bowl-shaped front bracket.

12. A vehicle brushless AC generator according to claim 11, wherein the second portion of the mold body includes at least one sandwiching portion provided in the opening to maintain the lead wire within the mold body.

13. A vehicle brushless AC generator according to claim 1, wherein the outermost layer of said lead wire is an insulating layer.

14. A vehicle brushless AC generator according to claim 1, wherein the lead wire is received into said mold body after said mold body is formed.

15. A vehicle brushless AC generator, comprising:
a rotary shaft;
a magnetic pole core firmly fixed to the rotary shaft, the magnetic pole core having a magnetic pole;
a field coil fixedly mounted on an inner peripheral portion of the magnetic pole core;
a yoke section that firmly fixes the field coil to form a magnetic circuit with a bias of the field coil;
a bowl-shaped front bracket that firmly fixes the yoke section and is supported by the rotary shaft through intermediation of a front bearing;
a stator core arranged to be opposed to the magnetic pole core through intermediation of a minute air gap;
a stator coil wound around the stator core;
a bowl-shaped rear bracket that firmly fixes the stator core together with the bowl-shaped front bracket and is supported by the rotary shaft through intermediation of a rear bearing;
a voltage regulator mounted to the bowl-shaped rear bracket, for controlling an energization current of the field coil;
a lead wire having one end connected to the field coil and another end connected to the voltage regulator, the lead wire being arranged at an inner peripheral portion of each of the bowl-shaped front bracket and the bowl-shaped rear bracket;
a groove formed in an inner wall of the bowl-shaped front bracket; and
a mold body mounted in the groove, the mold body comprising a body formed separately from the lead wire and into which the lead wire is insertable, so as to be disposed about an outermost layer of the lead wire for insulating and protecting the lead wire;
wherein the mold body includes at least one projection projecting from an outer periphery of the mold body, the at least one projection engaging an inner surface of the yoke section to fixedly position the mold body at the yoke section.

* * * * *